United States Patent
Lee et al.

(10) Patent No.: US 12,472,490 B2
(45) Date of Patent: Nov. 18, 2025

(54) CARBAZOLE-BASED ANION EXCHANGE MATERIAL, PREPARATION METHOD THEREFOR, AND USE THEREOF

(71) Applicant: KOREA RESEARCH INSTITUTE OF CHEMICAL TECHNOLOGY, Daejeon (KR)

(72) Inventors: Jang Yong Lee, Daejeon (KR); Seokhwan Yang, Daejeon (KR); Sang Hun Shin, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 634 days.

(21) Appl. No.: 17/800,285

(22) PCT Filed: Nov. 19, 2020

(86) PCT No.: PCT/KR2020/016404
§ 371 (c)(1),
(2) Date: Aug. 17, 2022

(87) PCT Pub. No.: WO2021/172706
PCT Pub. Date: Sep. 2, 2021

(65) Prior Publication Data
US 2023/0105570 A1 Apr. 6, 2023

(30) Foreign Application Priority Data
Feb. 28, 2020 (KR) .......................... 10-2020-0025271

(51) Int. Cl.
| | |
|---|---|
| *B01J 41/13* | (2017.01) |
| *B01J 41/07* | (2017.01) |
| *B01J 47/12* | (2017.01) |
| *C08G 61/12* | (2006.01) |
| *C08J 5/22* | (2006.01) |
| *C25B 13/08* | (2006.01) |
| *C25B 1/04* | (2021.01) |

(52) U.S. Cl.
CPC .............. *B01J 41/13* (2017.01); *B01J 41/07* (2017.01); *B01J 47/12* (2013.01); *C08G 61/124* (2013.01); *C08J 5/2262* (2013.01); *C25B 13/08* (2013.01); *C08G 2261/12* (2013.01); *C08G 2261/146* (2013.01); *C08G 2261/149* (2013.01); *C08G 2261/3241* (2013.01); *C08G 2261/40* (2013.01); *C08G 2261/70* (2013.01); *C08G 2261/90* (2013.01); *C08J 2365/00* (2013.01); *C25B 1/04* (2013.01)

(58) Field of Classification Search
USPC ............................................ 521/30; 525/540
See application file for complete search history.

(56) References Cited

U.S. PATENT DOCUMENTS

2017/0252707 A1* 9/2017 Bahar ..................... C25B 13/08

FOREIGN PATENT DOCUMENTS

| | | |
|---|---|---|
| CN | 107955138 A | 4/2018 |
| JP | 2019-530760 A | 10/2019 |
| KR | 10-2017-0051743 A | 5/2017 |

OTHER PUBLICATIONS

Lai, A, Nan, "Anion exchange membranes based on carbazole-containing polyolefin for direct methanol fuel cells", Journal of Membrane Science, 2016, 497, 99-107.
Wei, Zhenhong, "Low-potential electrochemical polymerization of carbazole and its alkyl derivatives", Journal of Electroanalytical Chemistry, 2006, 589, 112-119.
Deng, Yun, "Synthesis and characterization of red phosphorescent-conjugated polymers containing charged iridium complexes and carbazole unit", Synthetic Metals, 2007, 157, 813- 822.
International Search Report for International Application No. PCT/KR2020/016404 dated Mar. 10, 2021.
Written Opinion for International Application No. PCT/KR2020/016404 dated Mar. 10, 2021.

* cited by examiner

*Primary Examiner* — Fred M Teskin
(74) *Attorney, Agent, or Firm* — Harness, Dickey & Pierce, P.L.C.

(57) ABSTRACT

The present disclosure relates to a carbazole-based anion exchange material, a preparation method therefor and use thereof, and more particularly, to an anion exchange material used in membranes for water electrolysis, redox flow batteries, fuel cells, carbon dioxide reduction, electrochemical ammonia production and decomposition, electrodialysis (ED), reverse electrodialysis (RED) or capacitive deionization (CDI), a separator comprising the same, a preparation method therefor and use thereof. According to the present disclosure, it is possible to prepare a separation membrane with improved mechanical and chemical stability and durability by remarkably improving the molecular weight together with solubility in solvent by providing the anion exchange material in which all bonds between monomers in the main chain are C—C bonds based on the carbazole-based material with high stability.

11 Claims, 8 Drawing Sheets

CARBAZOLE-BASED ANION EXCHANGE MATERIAL, PREPARATION METHOD THEREFOR, AND USE THEREOF

This application is a national phase under 35 U.S.C. § 371 of PCT International Application No. PCT/KR2020/016404 which has an International filing date of Nov. 19, 2020, which claims priority to Korean Application No. 10-2020-0025271 filed Feb. 28, 2020, the entire contents of each of which are hereby incorporated by reference.

TECHNICAL FIELD

The present disclosure relates to a carbazole-based anion exchange material, a preparation method therefor and use thereof.

More particularly, the present disclosure relates to an anion exchange material used in membranes for water electrolysis, redox flow batteries, fuel cells, carbon dioxide reduction, electrochemical ammonia production and decomposition, electrodialysis (ED), reverse electrodialysis (RED) or capacitive deionization (CDI), a separator comprising the same, a preparation method therefor and use thereof.

The present application claims the benefit of Korean Patent Application No. 10-2020-0025271 filed on Feb. 28, 2020 with the Korean Intellectual Property Office, the disclosure of which is incorporated herein by reference in its entirety.

BACKGROUND ART

Recently, as population is growing, the exhaustion of fossil fuels, the rising level of pollution and the increasing demand for electrical energy trigger the need for the development of alternative energy sources. Accordingly, many researchers are attempting to invent new systems to produce electrical energy.

Among them, proton exchange membrane fuel cells (PEMFCs) using polymer electrolytes can directly convert chemical energy to electrical energy and produce a non-toxic material, water, as their product, and thus they are gaining much attention as alternative energy systems for vehicles and mobile electron devices. In the PEMFC, the important element is the polymer electrolyte membrane (PEM) that determines the performance and durability of the PEMFC and separates the two electrodes. Accordingly, high proton conductivity, strong mechanical properties, stable performance in water and low cost are essential for the selection of PEM.

In general, electrolyte membranes used in polymer electrolyte fuel cells may be classified into perfluorinated polymer electrolytes and hydrocarbon-based polymer electrolytes. The perfluorinated polymer electrolytes have chemical stability, good mechanical properties, and particularly, high conductivity as hydrogen ion exchange membranes due to the strong bonds between carbon-fluorine (CF) and the shielding effect of fluorine atom, and thus are now commercially available as polymer membranes of polymer electrolyte fuel cells. Nafion (perfluorinated sulfonic acid polymer) from Du Pont in USA is the typical example of commercially available hydrogen ion exchange membranes, and is used the most widely at present due to high ionic conductivity, chemical stability and ion selectivity. However, the perfluorinated polymer electrolyte membranes have good performance, but have the following disadvantages: low industrial use due to the high price, high methanol crossover or methanol transport through the polymer membranes, and reduced efficiency of the polymer membranes at the temperature of 80° C. or more, and according many studies have been made on hydrocarbon-based ion exchange membranes with price competitiveness.

With the growing demand for alternative energy that replaces fossil fuels, there is an increasing interest in eco-friendly energy conversion or storage systems with high efficiency and low price, and much attention is paid to fuel production through water electrolysis having high commercial feasibility as an important solution in view of environmental and energy issues. The water electrolysis is the technology that electrically and chemically decomposes water into hydrogen and oxygen, and in the anion exchange membrane-based water electrolysis process, a unit cell includes an anion exchange membrane, an anode on one side of the anion exchange membrane and a cathode on the other side of the anion exchange membrane. A plurality of unit cells are stacked in series to form a water electrolysis stack, and in the water electrolysis stack, an alkaline aqueous solution (KOH or NaOH) is supplied from an electrolyte solution tank and water is decomposed into hydrogen and a hydroxide ion ($OH^-$) at the cathode. The produced hydroxide ion is transferred through the anion exchange membrane in between and electrochemical reaction whereby oxygen is produced from the hydroxide ion occurs at the anode. Each electrochemical reaction occurs in the catalysts on a Gas Diffusion Layer (GDL), and in this instance, the anion exchange membrane as an electrolyte exhibits high hydroxide ion conductivity when it is in wet state, and serves to separate hydrogen and oxygen produced by water electrolysis due to low gas permeability.

In case that an electrochemical system uses an anion exchange membrane, not a cation exchange membrane, the electrochemical system operates under a high pH condition, and thus low-priced catalysts, not the existing high-priced platinum-based valuable metal catalysts, may be used, thereby reducing the overall system cost, and in light of the fact that the catalysts cost is about 50% of the stack manufacturing cost, the electrochemical system using the anion exchange membrane has higher economic efficiency. Nevertheless, it is difficult to commercialize the anion exchange membrane-based electrochemical system due to the low performance and durability of the anion exchange membrane which is a key chemical material.

It is known that separation membranes for use in fuel cells, water electrolysis, redox flow batteries, carbon dioxide reduction, electrochemical ammonia production and decomposition, electrodialysis (ED), reverse electrodialysis (RED) or capacitive deionization (CDI) systems are preferably anion exchange membranes that are chemically and mechanically stable, and a variety of polymer materials for such use have been developed and typical examples of the polymer materials include poly(arylene ether sulfone), poly(olefin), poly(styrene), poly(phenylene oxide) and poly(phenylene) comprising a functional group, for example, tetraalkylammonium, benzyl trimethyl ammonium, imidazolium, benzimidazolium, phosphonium. Currently, FAA-3 from Fumatech in Germany has been developed and is available as separation membrane and binder materials, but shows insufficient performance and durability in system applications, and recently, Ionomer in Canada has brought Aemion® to market for use in fuel cell and water electrolysis system applications, and Dioxide Materials in USA has manufactured Sustainion® anion exchange membrane product for use in electrochemical systems for the reduction of carbon dioxide, but it is known that the products have problems with durability and membrane performance, and thus for commercialization, better performance and durability than the currently developed anion exchange materials is required. Particularly, the development of anion exchange materials having the same structure, but the increased molecular weight that significantly affects the properties and durability of the polymer is the most important requirement for the commercial exploitation of electrochemical systems using the anion exchange membranes.

Its related prior art, Japanese Patent Publication No. 2019-530760 discloses crosslinked alkylated poly(benzimidazole) and poly(imidazole) polymer materials and fuel cells and water electrolyzers comprising the polymer materials, but anion exchange membranes for use in a wide range of applications including water electrolysis, redox flow batteries, fuel cells, carbon dioxide reduction, electrochemical ammonia production and decomposition, electrodialysis (ED), reverse electrodialysis (RED) or capacitive deionization (CDI) increasingly require the solubility in solvent and the improved mechanical and chemical stability and durability of separation membrane materials through molecular weight adjustment.

DISCLOSURE

Technical Problem

The present disclosure is developed to solve the above-described problems, and therefore the present disclosure is directed to providing a separation membrane for water electrolysis, redox flow batteries, fuel cells, carbon dioxide reduction, electrochemical ammonia production and decomposition, electrodialysis (ED), reverse electrodialysis (RED) or capacitive deionization (CDI) using, as an anion exchange material, a carbazole-based polymer with the improved properties and durability by maximizing the molecular weight with the introduction of a chain extender into the molecular structure.

The present disclosure is further directed to providing a water electrolyzer comprising a carbazole-based polymer for an Anion Exchange Membrane for Water Electrolysis (AEMWE).

Technical Solution

To solve the above-described problem, the present disclosure provides a method for preparing a polycarbazole-based anion exchange material comprising preparing a mixture of a halogen-containing carbazole-based monomer and a chain extending carbazole-based comonomer having at least two carbazole groups in a molecule structure; carrying out a polymerization reaction of the mixture using a superacid catalyst to produce a polycarbazole-based polymer comprising a halogen-containing chain extender in which all bonds between monomers in a main chain are C—C bonds; and introducing an anion exchange group through quaternization of the polycarbazole-based polymer comprising the halogen-containing chain extender.

Additionally, the present disclosure provides a separation membrane for water electrolysis, redox flow batteries, fuel cells, carbon dioxide reduction, electrochemical ammonia production and decomposition, electrodialysis (ED), reverse electrodialysis (RED) or capacitive deionization (CDI).

Additionally, the present disclosure provides a water electrolyzer comprising the separation membrane as an Anion Exchange Membrane for Water Electrolysis (AEMWE).

Advantageous Effects

The present disclosure may prepare a separation membrane for water electrolysis, redox flow batteries, fuel cells, carbon dioxide reduction, electrochemical ammonia production and decomposition, electrodialysis (ED), reverse electrodialysis (RED) or capacitive deionization (CDI) with the improved mechanical and chemical stability and durability by significantly improving the molecular weight with the introduction of a small amount of chain extenders together with solubility in solvent by providing an anion exchange material based on a carbazole-based material in which the main chain does not include a linking group of electron donating properties, for example, —O—, —S—, and is comprised completely of C—C bonds.

BEST MODE

Figure 1:
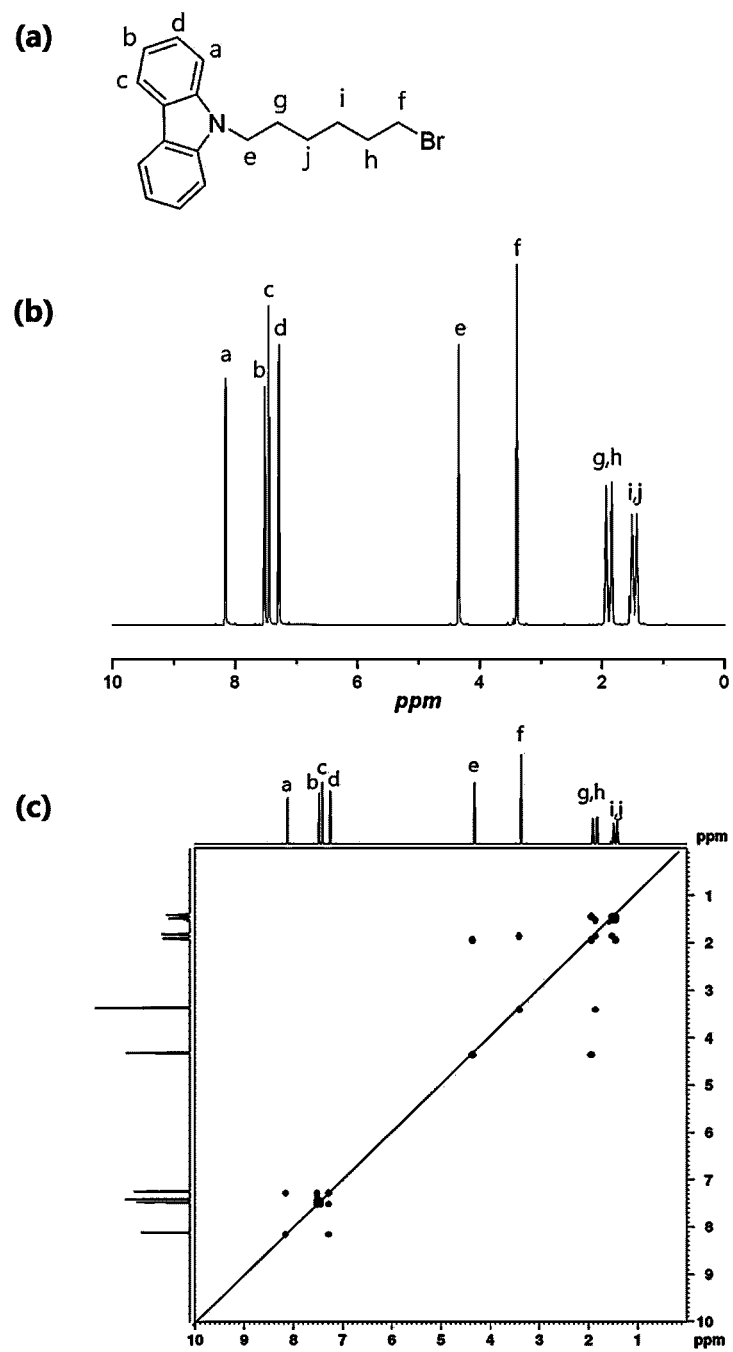
FIG. 1 shows the $^1$H-NMR spectrum analysis results of a halogen-containing carbazole-based monomer M1 according to an embodiment of the present disclosure.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present disclosure relates to a carbazole-based anion exchange material, a preparation method therefor and use thereof, and more particularly, the present disclosure provides an anion exchange material used in membranes for water electrolysis, redox flow batteries, fuel cells, carbon dioxide reduction, electrochemical ammonia production and decomposition, electrodialysis (ED), reverse electrodialysis (RED) or capacitive deionization CDI), a separator comprising the same and a preparation method therefor.

To solve the above-described problem, the present disclosure provides a method for preparing a polycarbazole-based anion exchange material comprising preparing a mixture of a halogen-containing carbazole-based monomer and a chain extending comonomer having at least two carbazole groups in the molecule structure; carrying out a polymerization reaction of the mixture using a superacid catalyst to produce a polycarbazole-based polymer comprising a halogen-containing chain extender in which all bonds between monomers in the main chain are C—C bonds; and introducing an anion exchange group through quaternization of the polycarbazole-based polymer comprising the halogen-containing chain extender.

The 'polycarbazole-based polymer comprising the chain extender' as used herein refers to polycarbazole comprising a chain extender in the molecule structure prepared using, as the 'chain extending carbazole-based comonomer', a monomer with at least two carbazole groups linked through a linking group, for example, an alkyl group in the molecule structure like the monomer (Monomer 2: M2) of the following reaction equation 1. That is, it refers to any type of polycarbazole synthesized from a comonomer of a substituted or unsubstituted carbazole monomer having a carbazole group and a substituted or unsubstituted carbazole monomer having at least two carbazole groups linked through a linking group, for example, an alkyl group in the molecule structure, and in this instance, the 'chain extending carbazole-based comonomer' having at least two carbazole groups in the molecule structure may act as a crosslinker when it is included in excess, but when used in an optimum amount taking the reactivity of carbazole into account, crosslinking does not occur and the molecular weight may increase. In this instance, the mix ratio of the 'chain extending comonomer' having at least two carbazole groups in the molecule structure for the increased molecular weight without crosslinking reaction is preferably 0.1 to 5 mol % based on the total number of moles of monomer. When the 'chain extending comonomer' is included in the above-described range, the increase in molecular weight is more dominant than crosslinking by the reactivity of carbazole.

The polycarbazole-based anion exchange material according to an embodiment of the present disclosure may be prepared by the method of the following reaction equation 1.

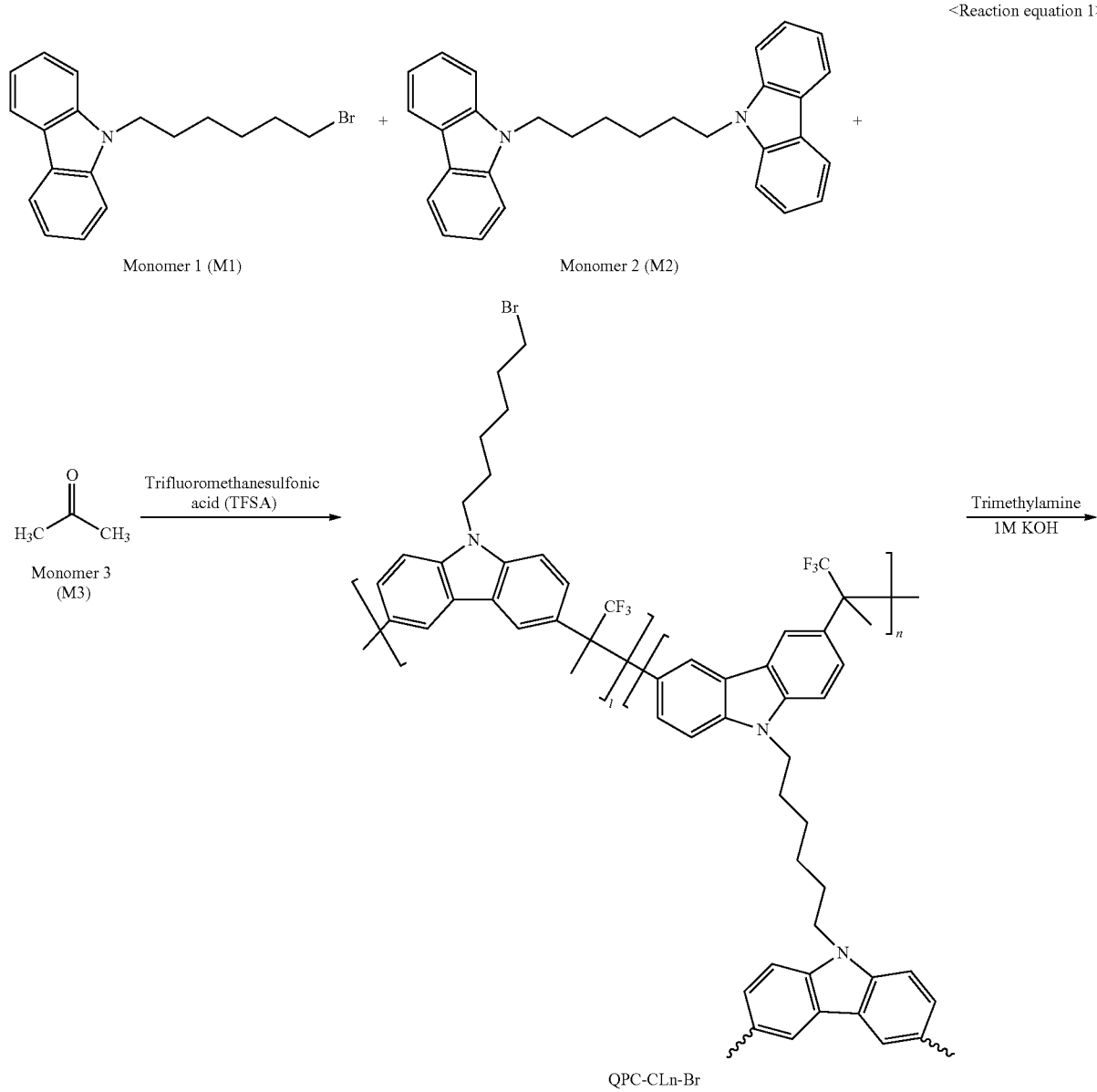

<Reaction equation 1>

-continued

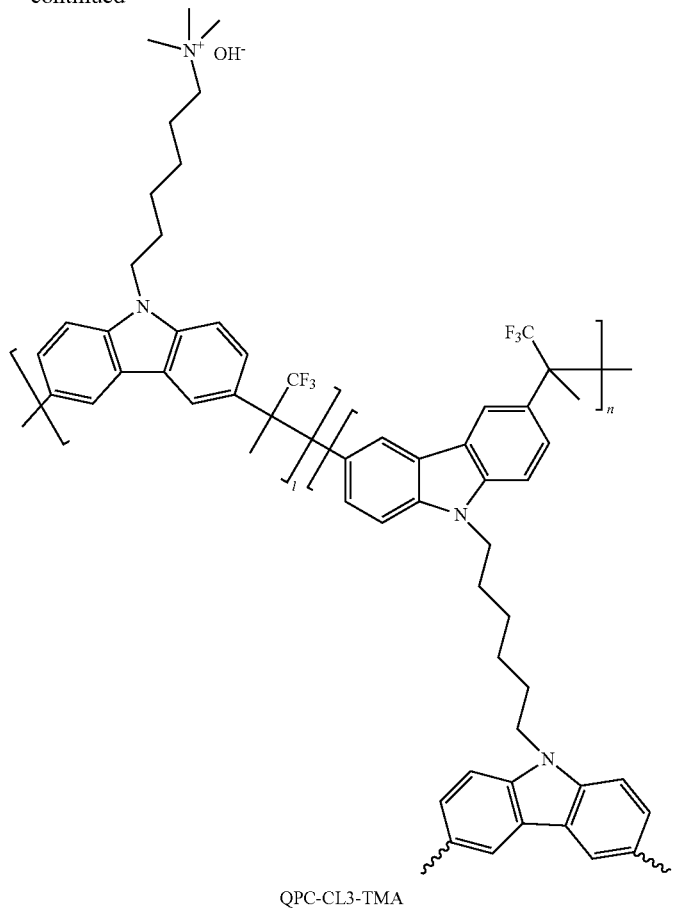

QPC-CL3-TMA

In the preparation method according to an embodiment of the present disclosure, the halogen-containing carbazole-based monomer may be prepared by mixing and a carbazole compound and a halogen-containing hydrocarbon-based compound to cause reaction, cooling and settling a reaction product, and extracting and purifying the reaction product.

In this instance, the carbazole-based compound may be the mixture of the halogen-containing carbazole-based monomer and the 'chain extending carbazole-based comonomer' having at least two carbazole groups in the molecule structure, and in this instance, the mix ratio of the 'chain extending comonomer' having at least two carbazole groups in the molecule structure is preferably 0.1 to 5 mol % based on the total number of moles of monomer.

According to an embodiment of the present disclosure, the halogen atom of the halogen-containing hydrocarbon-based compound may be any one of chloride (Cl), bromine (Br) and iodine (I).

In the preparation method according to an embodiment of the present disclosure, the superacid catalyst may be trifluoromethanesulfonic acid ($CF_3SO_3H$) or fluorosulfonic acid ($HSO_3F$).

The polycarbazole-based polymer comprising the halogen-containing chain extender may have the chemical structure of the following Formula 1.

<Formula 1>

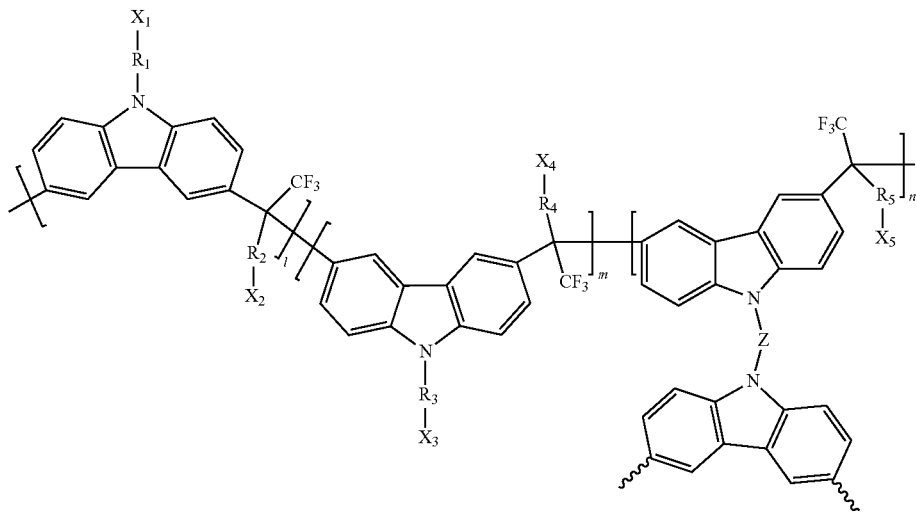

In the above Formula 1, each of the $R_1$~$R_5$ substituents is independently an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen, or sulfur atom in its chain; or an alkyl group, an aryl group, an allyl group with at least one anion exchange group; or an alkyl group, an aryl group, an allyl group, a cyano group, a perfluoroalkyl group and an —O— perfluoroaryl group with a fluorine atom and with at least one anion exchange group, and the substituents may be identical or different in each repeating unit or for each repeating unit,
  each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof,
  each of the $X_1$~$X_5$ is independently a hydrogen atom or any one of halogen atoms, chloride (Cl), bromine (Br) and iodine (I), wherein at least one of the $X_1$ or X3 is a halogen atom,
  Z is an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen, or sulfur atom in its chain; or an alkyl group, an aryl group, an allyl group with at least one anion exchange group; or an alkyl group, an aryl group, an allyl group, a cyano group, a perfluoroalkyl group and an —O— perfluoroaryl group with a fluorine atom and with at least one anion exchange group, and
  the number of repeating units, l, m and n is an integer of 100,000 or smaller, and l and m may be 0, and satisfy the condition, $1<(l+m)/n<1{,}000$.

In the preparation method according to an embodiment of the present disclosure, the halogen-containing carbazole-based monomer may form the halogen-containing polycarbazole-based polymer in which all bonds between monomers in the main chain are C—C bonds using the polymerization reaction using the superacid catalyst. The polymerization reaction may be carried out by a C—C bond synthesis method using the superacid catalyst to produce the polycarbazole-based polymer comprising the halogen-containing chain extender having the chemical structure of the above Formula 1 in which the main chain does not include an electron donating group, for example, —O—, —S—, and is comprised completely of C—C bonds.

According to an embodiment of the present disclosure, the polycarbazole-based anion exchange material comprising the halogen-containing chain extender may have the chemical structure of the following Formula 2.

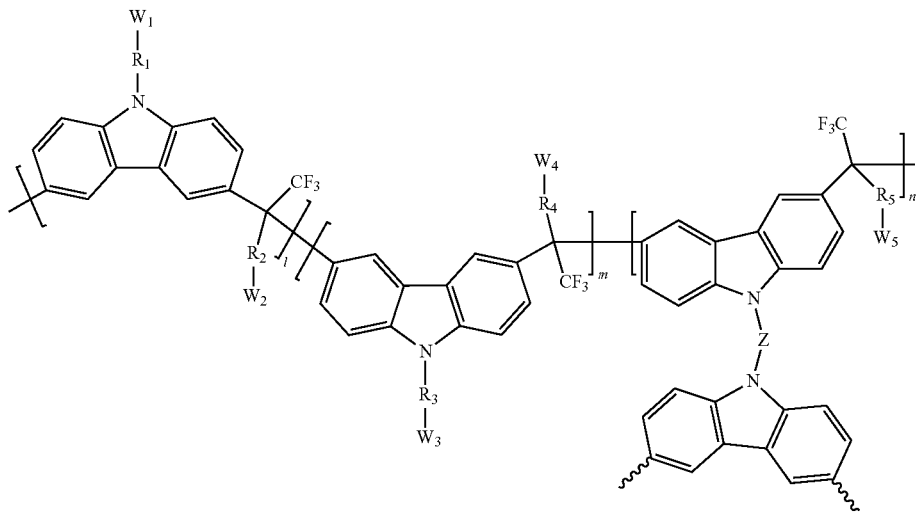

<Formula 2>

In the above Formula 2, each of the $R_1$~$R_5$ substituents is independently an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen, or sulfur atom in its chain, an alkyl group, an aryl group, an allyl group with at least one anion exchange group; or an alkyl group, an aryl group, an allyl group, a cyano group, a perfluoroalkyl group and an —O— perfluoroaryl group with a fluorine atom and at least one anion exchange group, and the substituents may be identical or different in each repeating unit or for each repeating unit,

- each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof,
- each of the $X_1$~$X_5$ is independently a hydrogen atom or any one of halogen atoms, chloride (Cl), bromine (Br) and iodine (I), wherein at least one of the $X_1$ or X3 is a halogen atom,
- Z is an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen, or sulfur atom in its chain; or an alkyl group, an aryl group, an allyl group with at least one anion exchange group; or an alkyl group, an aryl group, an allyl group, a cyano group, a perfluoroalkyl group and an —O— perfluoroaryl group with a fluorine atom and with at least one anion exchange group,
- the number of repeating units, l, m and n, is an integer of 100,000 or smaller, and l and m may be 0, and satisfy the condition, 1<(l+m)/n<1,000, and
- each of the $W_1$~$W_5$ is independently a hydrogen atom or an anion exchange group, at least one of the $W_1$ or $W_3$ is an anion exchange group, and each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group, a piperidinium group or a basic anion exchange functional group thereof.

According to an embodiment of the present disclosure, the superacid catalyst may be present in an amount of 0.1 to 100 equivalents based on the total number of halogen-containing carbazole-based monomers. Preferably, the superacid catalyst may be present in an amount of 1 to 20 equivalents based on the total number of halogen-containing carbazole-based monomers.

According to an embodiment of the present disclosure, the step of producing the halogen-containing polycarbazole-based polymer may include mixing and stirring the halogen-containing carbazole-based monomer and the superacid catalyst in a solvent, and in this instance, the solvent may include an organic solvent containing halogen, for example, $CCl_4$, $CHCl_3$, $CH_2Cl_2$, $C_2H_2Cl_4$, iodine, bromine or fluorine.

In the preparation method according to an embodiment of the present disclosure, the polycarbazole-based polymer comprising the halogen-containing chain extender may be prepared for the anion exchange material having the anion conducting group by the quaternization. The polycarbazole-based anion exchange material having the chemical structure of the following Formula 2 may be prepared by substituting the anion conducting group at the halogen atom position of the polycarbazole-based polymer comprising the halogen-containing chain extender by the quaternization.

<Formula 2>

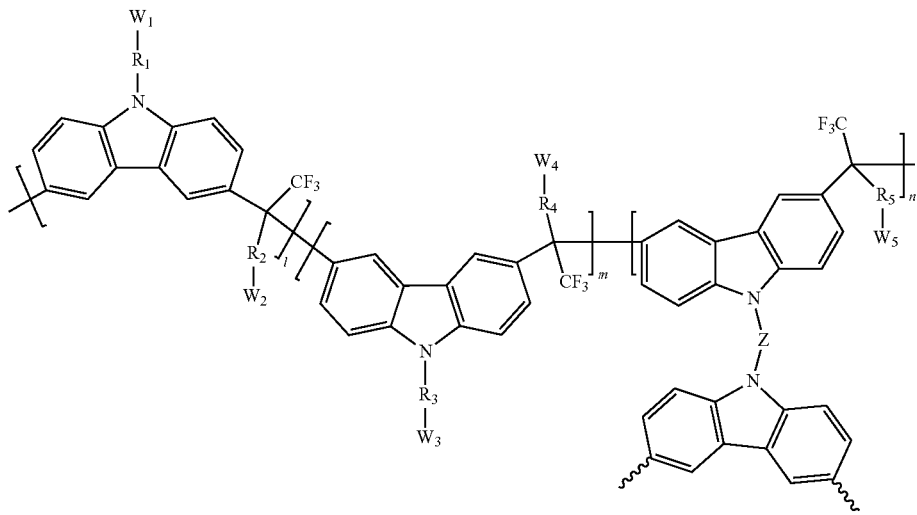

In the above Formula 2, each of the $R_1$~$R_5$ substituents is independently an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen, or sulfur atom in its chain; or an alkyl group, an aryl group, an allyl group with at least one anion exchange group; or an alkyl group, an aryl group, an allyl group, a cyano group, a perfluoroalkyl group and an —O— perfluoroaryl group with a fluorine atom and with at least one anion exchange group, and the substituents may be identical or different in each repeating unit or for each repeating unit, each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof, each of the $X_1$~$X_5$ is independently a hydrogen atom or any one of halogen atoms, chloride (Cl), bromine (Br) and iodine (I), wherein at least one of the $X_1$ or X3 is a halogen atom, Z is an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen, or sulfur atom in its chain; or an alkyl group, an aryl group, an allyl group with at least one anion exchange group; or an alkyl group, an aryl group, an allyl group, a cyano group, a perfluoroalkyl group and an —O— perfluoroaryl group with a fluorine atom and with at least one anion exchange group, the number of repeating units, l, m and n, is an integer of 100,000 or smaller, and l and m may be 0, and satisfy the condition, 1<(l+m)/n<1,000, and each of the $W_1$~$W_5$ is independently a hydrogen atom or an anion exchange group, at least one of the $W_1$ or $W_3$ is an anion exchange group, and each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group, a piperidinium group or a basic anion exchange functional group thereof.

Additionally, the present disclosure provides a separation membrane comprising the polycarbazole-based anion exchange material prepared by the preparation method.

In this instance, the separation membrane may be any one selected from the group consisting of a single membrane, a reinforced membrane, a composite membrane and a reinforced composite membrane made of the corresponding ion exchange material, and specifically, the single membrane refers to a separation membrane prepared using, as the main material, the ion exchange material according to an embodiment of the present disclosure, the reinforced membrane may include a support, for example, a porous membrane based on polyethylene, polypropylene, polytetrafluoroethylene, polyvinylidenefluoride, polystyrene, polysulfone, polyvinylalcohol, polybenzimidazole, polyimide, polyamide-imide, glass fiber, cellulose or a mixture thereof or an organic or inorganic material-based porous membrane having pores therein, impregnated with the ion exchange material according to an embodiment of the present disclosure to improve the mechanical properties of the membrane, the composite membrane may include the ion exchange material according to an embodiment of the present disclosure as the main material and organic- or inorganic- or organic/inorganic hybrid-based nanoparticles and additives to reduce the crossover of fuels and active materials or improve the performance, and the reinforced composite membrane is a combination of the concepts of the composite membrane and the reinforced membrane and may be prepared by impregnating the organic or inorganic material-based porous support with the composite membrane of the anion exchange material comprising nanoparticles and additives.

In this instance, the separation membrane may be used for water electrolysis, redox flow batteries, fuel cells, carbon dioxide reduction, electrochemical ammonia production and decomposition, electrodialysis (ED), reverse electrodialysis (RED) or capacitive deionization (CDI), and more preferably, the separation membrane may be an Anion Exchange Membrane for Water Electrolysis (AEMWE).

Additionally, the present disclosure provides a water electrolyzer comprising the separation membrane comprising the polycarbazole-based anion exchange material prepared by the preparation method for an Anion Exchange Membrane for Water Electrolysis (AEMWE).

Hereinafter, embodiments and examples of the present disclosure will be described in sufficient detail for those skilled in the art to practice the exemplary embodiments of the present disclosure with reference to the accompanying drawings. Particularly, the technical aspects of the present disclosure and its essential elements and operation are not limited thereby. Additionally, the present disclosure may be embodied in many different forms, and is not limited to the embodiments and examples described herein.

The carbazole-based anion exchange material according to an embodiment of the present disclosure is prepared by the method of the following reaction equation 1.

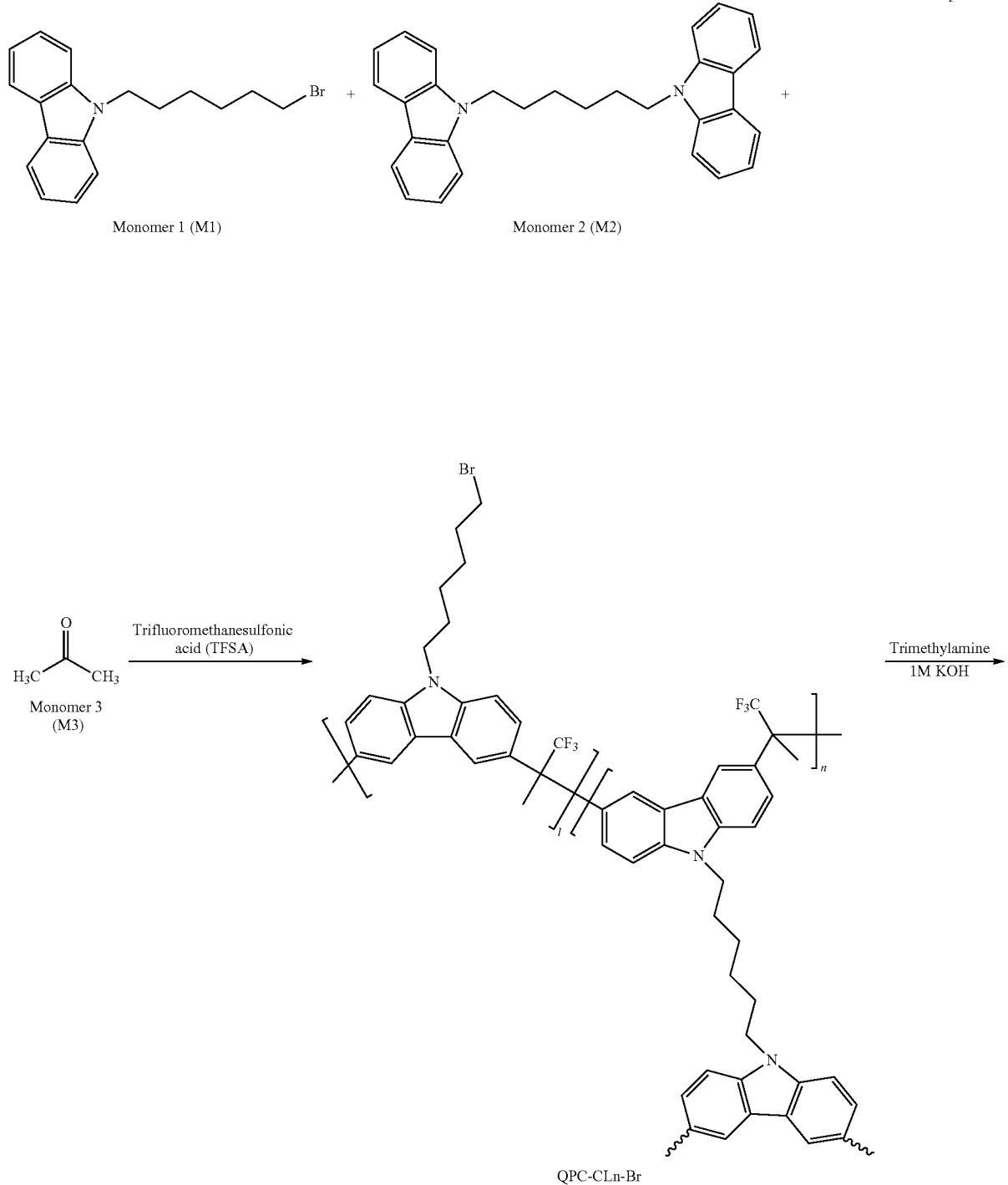

-continued

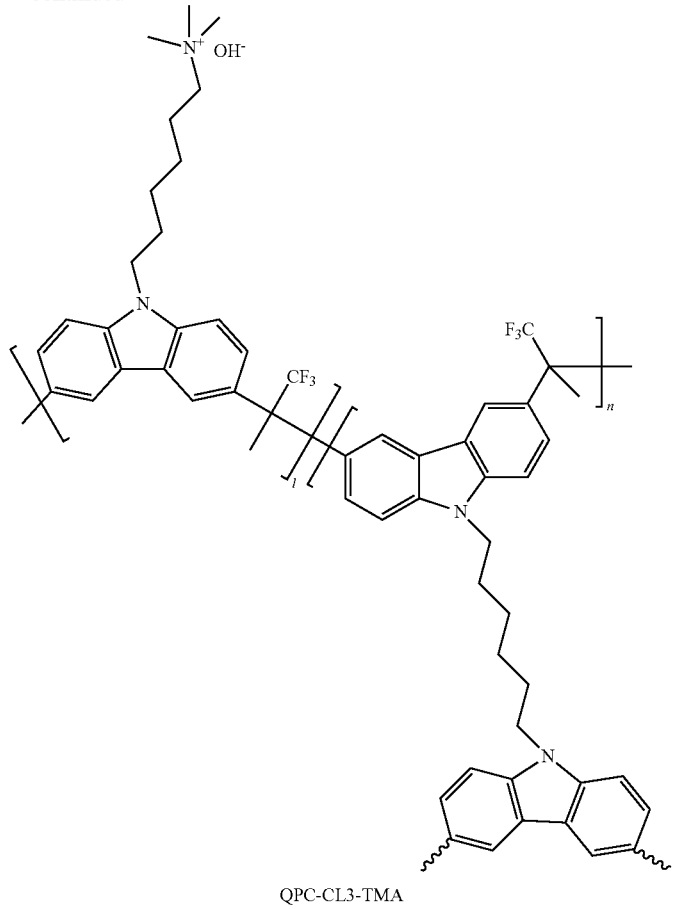

QPC-CL3-TMA

<Preparation Example 1> Preparation of Halogen-Containing Carbazole-Based Monomer (M1)

The halogen-containing carbazole-based monomer (Monomer 1: M1) of the above reaction equation 1 according to an embodiment of the present disclosure is prepared as follows. To begin with, 10.0 g carbazole and 43.0 g dibromohexane are dissolved in 200 mL of N,N'-dimethylformamide in a flask in which the atmosphere is replaced with argon. The flask containing the solution is reduced down to 0° C. using an ice bath, potassium hydroxide (3.4 g) is added, causing reaction, and the reaction proceeds for 24 hours. The reaction is followed by precipitation using iced water and extraction using methylene chloride (MC) to obtain a reaction product. The obtained reaction product is purified through column chromatography and recrystallized using ethanol to prepare the halogen-containing carbazole-based monomer (M1) of the above reaction equation 1.

FIG. 1 shows the $^1$H-NMR spectrum analysis results of the halogen-containing carbazole-based monomer according to an embodiment of the present disclosure. (a) of FIG. 1 shows the structural formula of the halogen-containing carbazole-based monomer according to an embodiment of the present disclosure, and (b) and (C) of FIG. 1 show the $^1$H-NMR spectrum and COZY NMR analysis results of the halogen-containing carbazole-based monomer.

For $^1$H-NMR spectrum analysis, 500 MHz Bruker AVANCE is used, the reference is tetramethylsilane (TMS), and the solvent is DMSO-d$_6$ (δ=2.50 ppm) and CDCl$_3$ (δ=7.28 ppm).

<Preparation Example 2> Preparation of Chain Extending Carbazole-Based Comonomer (M2)

The chain extending carbazole-based monomer (Monomer 2: M2) of the above reaction equation 1 according to an embodiment of the present disclosure is prepared as follows.

47.3 g carbazole and 15.9 g potassium hydroxide are dissolved in 355 mL of N,N'-dimethylformamide in a flask in which the atmosphere is replaced with argon. The flask containing the solution is reduced down to 0° C. using an ice bath, 34.5 g dibromohexane is added and stirred for 30 minutes, the temperature is raised to room temperature, causing reaction, and the reaction proceeds for 48 hours. When the reaction is completed, to remove the potassium hydroxide, filtration is performed, and the reactant is added to a solution of methylene chloride (MC) and distilled water at a 2:1 ratio, followed by stirring for 1 hour. After the stirring is completed, only the methylene chloride layer is separated from the phase separated layer using a separatory funnel. The separated methylene chloride layer is washed using a supersaturated sodium chloride solution. To remove the remaining moisture present in the washed reactant, magnesium sulfate is used. The magnesium sulfate is removed through filtration, and the solvent is removed using a rotary evaporator. The product remaining after the removal of the solvent is recrystallized using methanol to prepare the carbazole-based monomer (Monomer 2: M2) of the above reaction equation 1.

Figure 2:
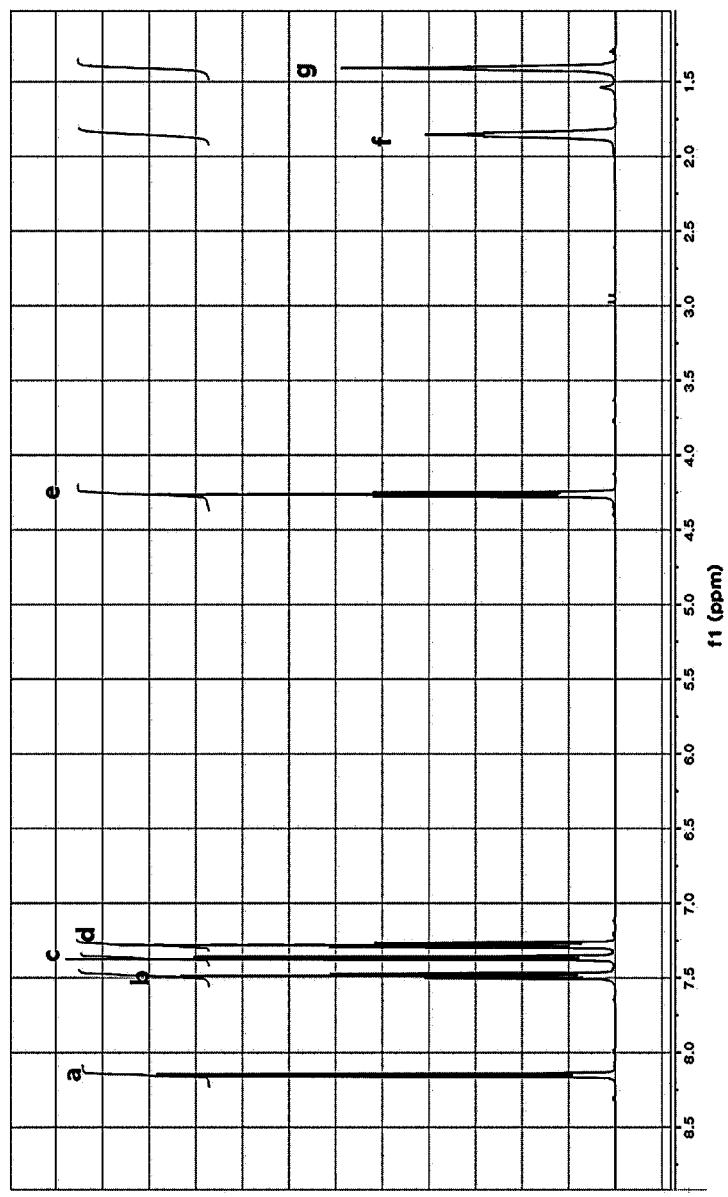
FIG. 2 shows the $^1$H-NMR spectrum analysis results of a carbazole-based monomer M2 according to an embodiment of the present disclosure.
Figure 2:
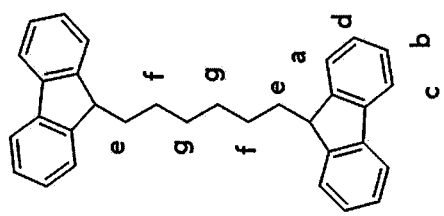

FIG. 2 shows the $^1$H-NMR spectrum analysis results of the carbazole-based monomer M2 according to an embodiment of the present disclosure.

<Preparation Example 3> Preparation of Halogen-Containing Polycarbazole-Based Polymer (QPC-CLn-Br)

The halogen-containing polycarbazole-based polymer (QPC-CLn-Br) according to an embodiment of the present disclosure is prepared by the following method.

When a completely dried flask is prepared, M1 (10 g) and M2 (n mol % of M1) of the above reaction equation 1, trifluoroacetone (4.4 g) and trifluoromethanesulfonic acid (43.2 g) are dissolved in methylene chloride (24 ml) and stirred at 0° C. under an Ar atmosphere for about 2 h, and after the temperature is raised to room temperature, reaction proceeds for 24 h, and after the reaction is completed, the mixture is washed with methanol to obtain a polymer, and the polymer is dried in vacuum at 80° C., yielding QPC-CLn-Br polymer. The synthesized polymer is analyzed by $^1$H-NMR spectroscopy, and it is found that the polymer is synthesized by comparing the number of aromatic hydrogens and aliphatic hydrogens.

<Preparation Example 4> Preparation of Polycarbazole-Based Anion Exchange Material (QPC-CLn-TMA)

The polycarbazole-based anion exchange material having the anion exchange group introduced through quaternization of the halogen-containing polycarbazole-based polymer according to the present disclosure is prepared by the following method.

45 wt % trimethylamine solution is slowly add in drops to a solution in which 10 wt % of the halogen-containing polycarbazole-based polymer (QPC-CLn-Br) prepared according to the Preparation example 3 is dissolved in dimethylforamide (DMF), followed by reaction for 24 hours, and the product is left undisturbed to settle in tertiary distilled water to prepare the polycarbazole-based anion exchange material (QPC-CLn-TMA) having the anion conducting group according to an embodiment of the present disclosure.

Figure 3:
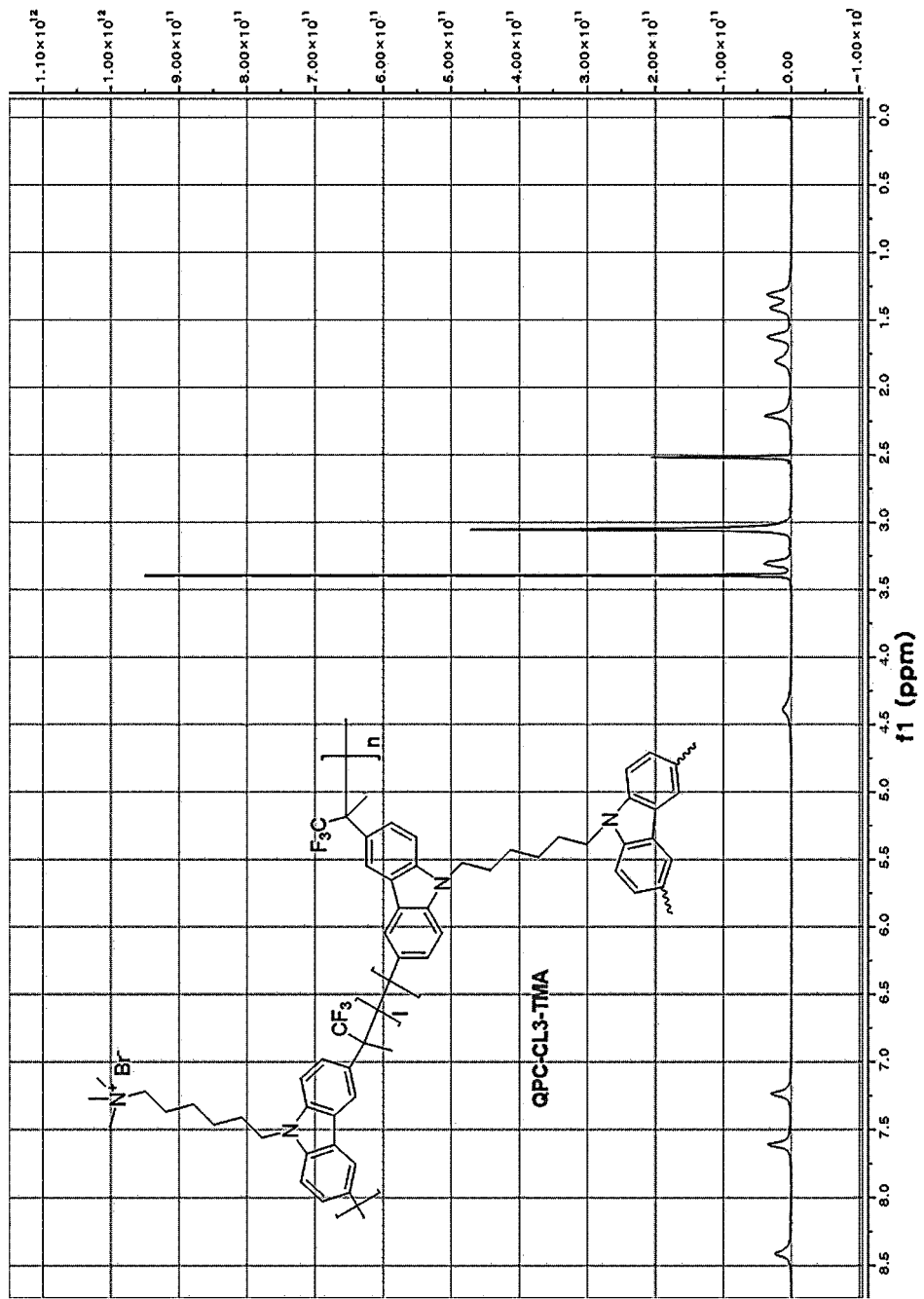
FIG. 3 shows the $^1$H-NMR spectrum analysis results of a carbazole-based anion exchange material comprising a chain extender according to an embodiment of the present disclosure.

FIG. 3 shows the $^1$H-NMR spectrum analysis results of the carbazole-based anion exchange material according to an embodiment of the present disclosure.

<Comparative Example> Preparation of Polycarbazole-Based Anion Exchange Material (QPC-TMA)

For comparison with the polycarbazole-based anion exchange material prepared by the above-described preparation method, the polycarbazole-based anion exchange material (QPC-TMA) of the following Formula 3 is prepared using the same method as Preparation examples 3 and 4 except that the monomer (M2) of Preparation example 2 is not used.

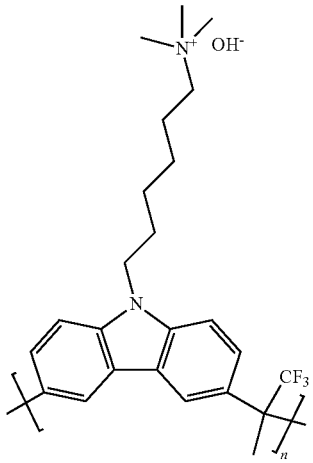

<Formula 3>

<Analysis Example> Evaluation of Properties of Polycarbazole-Based Anion Exchange Material To begin with, $^1$H NMR spectrum is recorded on 500 MHz Bruker AVANCE using tetramethylsilane (TMS) reference, and DMSO-d$_6$ (δ=2.50 ppm) and CDCl$_3$ (δ=7.28 ppm) solvents are used.

Figure 4:
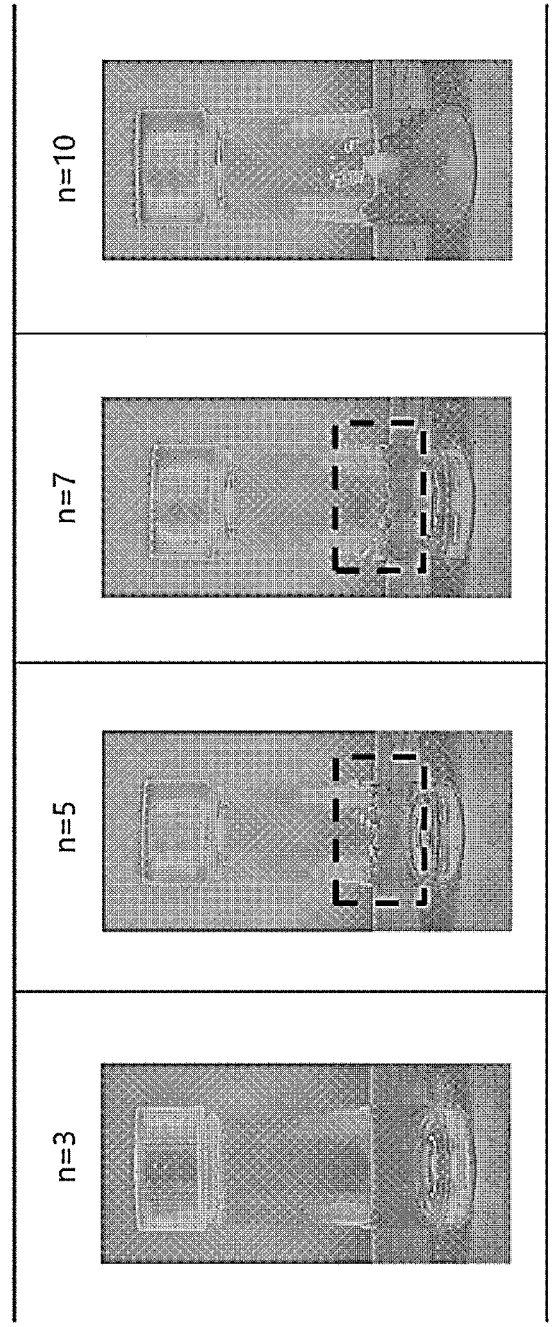
FIG. 4 shows the analysis results of the solubility in an N-Methyl-2-pyrrolidone (NMP) solvent for a polycarbazole-based anion exchange material comprising a chain extender prepared according to an embodiment of the present disclosure.

FIG. 4 shows the analysis results of the solubility in an N-Methyl-2-pyrrolidone (NMP) solvent for the polycarbazole-based anion exchange material prepared according to an embodiment of the present disclosure.

The molecular weight of the prepared polymer is measured by gel permeation chromatography (GPC) using HR columns 3 and 4 with Waters 2414 model detector, the prepared polymer is dissolved in a DMAc solution containing 0.05 M LiBr and injected, the test is conducted at 25° C. and the flow rate of 1.0 mL/min, and the analysis results are summarized in Table 1.

TABLE 1

| | Number average molecular weight (g/mol) | Weight average molecular weight (g/mol) | PDI |
|---|---|---|---|
| Example (QPC-CL3-Br) | 55,966 | 238,017 | 4.25 |
| Comparative example (QPC-Br) | 44,786 | 67,624 | 1.51 |

The chain extender used in the preparation of the present disclosure has at least three reaction points and thus can be used as a crosslinker, so it is very important to use at the optimum ratio taking reactivity into account. As can be seen from Table 1, when compared with comparative example, the developed QPC-CL3-Br has the same reaction process, but has a very high molecular weight, increased by 3 times or more by attaching even a small amount of chain extenders. This may significantly affect the improvement of the properties and durability of the material.

Through the above Table 1, it can be seen that the polymer of example has higher molecular weight than comparative example.

FIG. 4 shows the analysis results of the solubility in an NMP solvent for the polycarbazole-based anion exchange material prepared according to an embodiment of the present disclosure.

Figure 5:
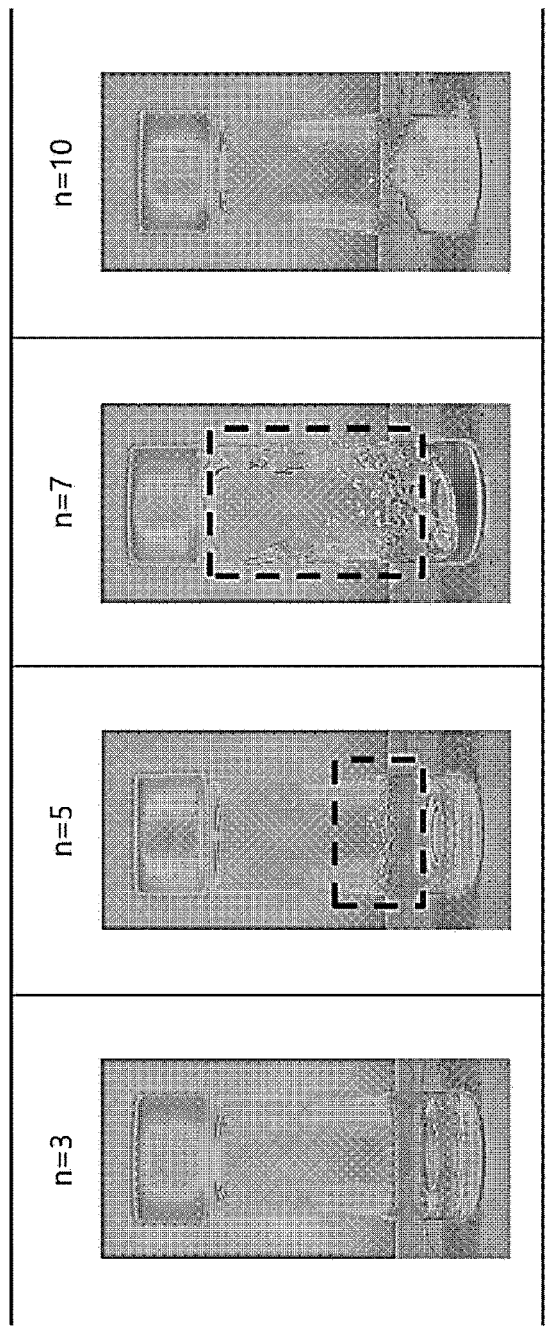
FIG. 5 shows the analysis results of the solubility in solvent for a polycarbazole-based anion exchange material comprising a chain extender prepared according to an embodiment of the present disclosure.

FIG. 5 shows the analysis results of the solubility in a DMF solvent for the polycarbazole-based anion exchange material prepared according to an embodiment of the present disclosure.

As shown in FIGS. 4 and 5, the 'chain extending carbazole-based comonomer' which is a monomer with at least two carbazole groups linked through a linking group, for example, an alkyl group in the molecule structure, can act as a crosslinker, and thus when used in excess, crosslinking occurs. However, when used in the optimum amount taking the reactivity of carbazole into account, crosslinking does not occur and the molecular weight may increase. In this instance, the mix ratio of the 'chain extending comonomer' having at least two carbazole groups in the molecule structure for the increased molecular weight without crosslinking reaction is preferably 0.1 to 5 mol % based on the total number of moles of monomer. When the 'chain extending comonomer' is included in the above-described range, the increase in molecular weight is more dominant than crosslinking by the reactivity of carbazole, effectively yielding the main chain of the polymer with the maximized molecular weight and which is solution-processable.

To compare the mechanical strength of the anion exchange membrane prepared according to an embodiment of the present disclosure, the tensile strength of the membranes of example and comparative example is measured using Universal Testing Machine (UTM) and compared, Lloyd Instrument LRSK is used for UTM, the membranes are measured in wet state and dry state, and in this instance, the crosshead speed is 10 mm/min.

Figure 6:
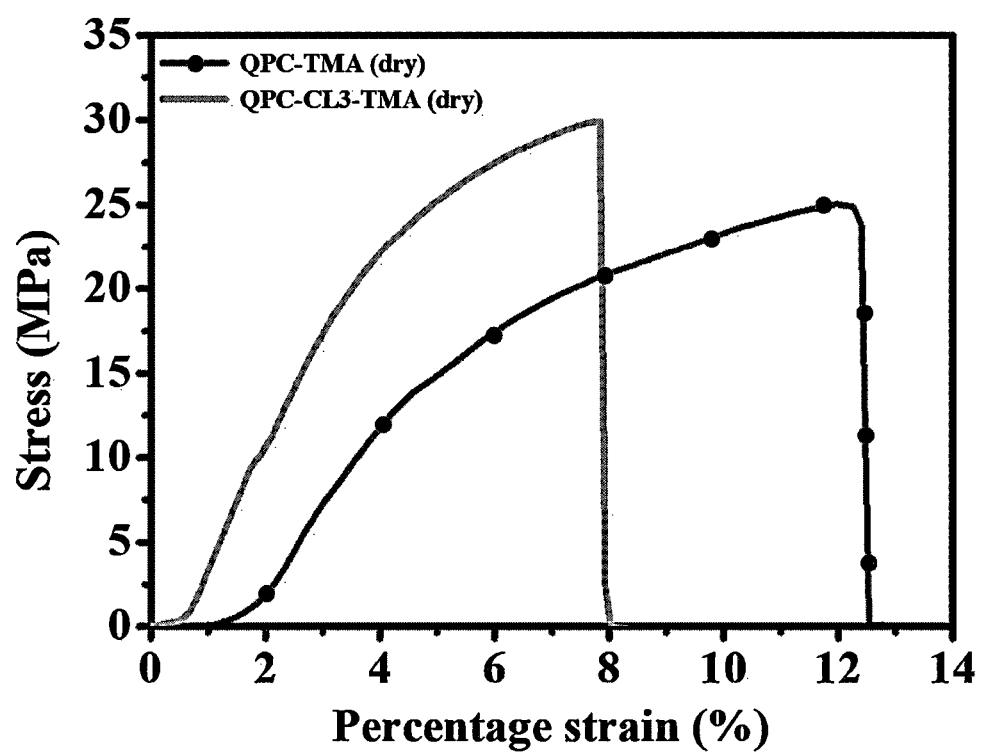
FIG. 6 shows the analysis results of the mechanical properties in dry state for a polycarbazole-based anion exchange material comprising a chain extender prepared according to an embodiment of the present disclosure.

FIG. 6 shows the analysis results of the mechanical properties in dry state for the polycarbazole-based anion exchange material prepared according to an embodiment of the present disclosure.

Figure 7:
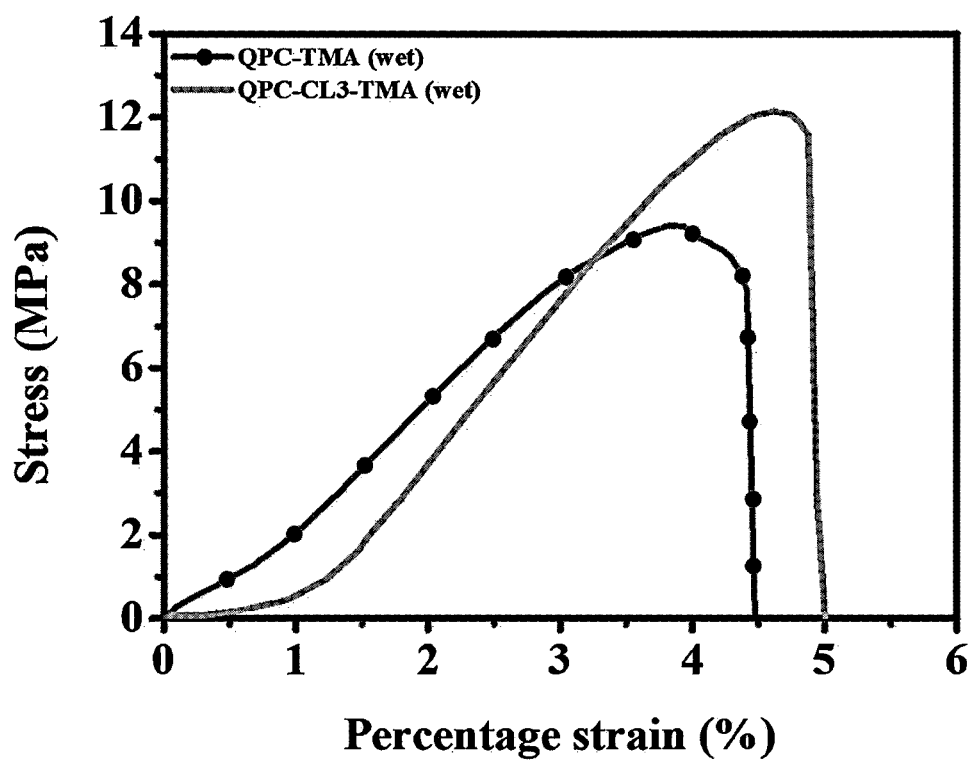
FIG. 7 shows the analysis results of the mechanical properties in wet state for a polycarbazole-based anion exchange material comprising a chain extender prepared according to an embodiment of the present disclosure.

FIG. 7 shows the analysis results of the mechanical properties in wet state for the polycarbazole-based anion exchange material prepared according to an embodiment of the present disclosure.

The measurement results in FIGS. 6 and 7 are summarized in the following Table 2.

TABLE 2

| | Tensile strength (MPa) | | Elongation (%) | | Elastic modulus (MPa) | |
|---|---|---|---|---|---|---|
| | Dry | Wet | Dry | Wet | Dry | Wet |
| Example (QPC-CL3-TMA) | 30.0 | 12.2 | 8.0 | 5.0 | 840 | 406 |
| Comparative example (QPC-TMA) | 25.0 | 9.4 | 12.5 | 4.4 | 612 | 325 |

As shown in FIGS. 6 and 7 and Table 2 in which their results are summarized, the mechanical properties between the material having the maximized molecular weight with the introduction of the chain extending crosslinker is compared with the low molecular weight material. The molecular weight is a very important factor for determining the mechanical properties of the material, and it can be seen that as the molecular weight increases, the tensile strength is improved by 20% and 30% in dry and wet state, respectively. Particularly, when considering that water electrolysis is driven in wet state, the properties improved by 30% in wet state may significantly affect the durability of the entire system.

To compare the chemical durability, a soak test is conducted in 1M KOH aqueous solution at 80° C. for 1,000 hours, and during the test, the ionic conductivity (OH⁻) of the sample is measured every 100 hours, and the measurement is made using a 4-terminal ion conductor cell using impedance measurement machine (Solartron 1280) in a wet chamber (SH-241, ESPEC).

Figure 8:
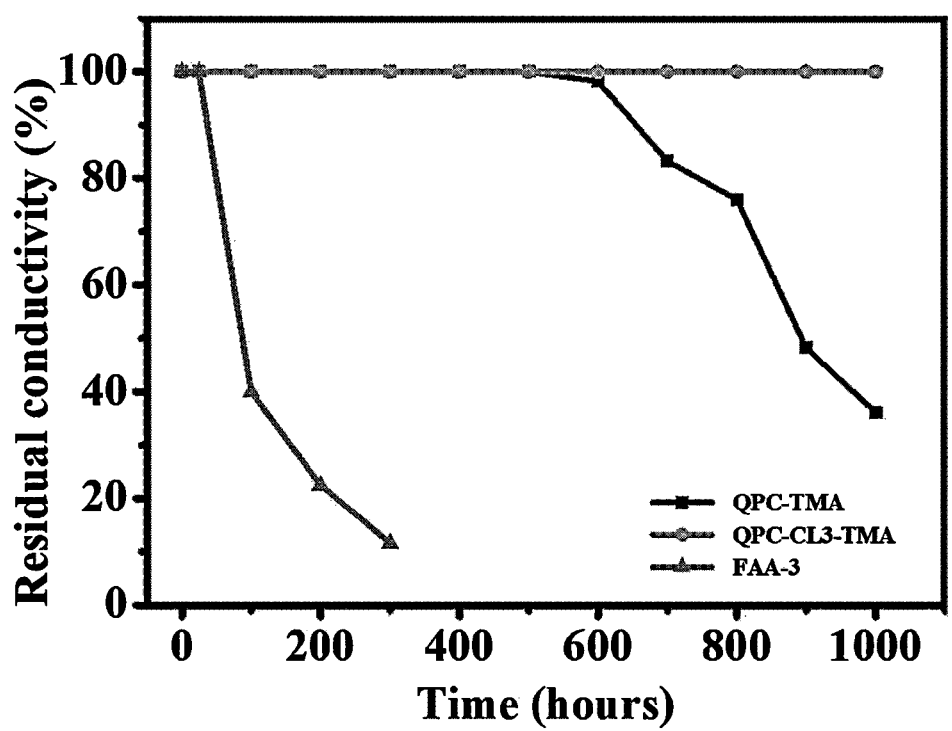
FIG. 8 shows the measurement results of the chemical stability of a polycarbazole-based anion exchange material comprising a chain extender prepared according to an embodiment of the present disclosure.

FIG. 8 shows the chemical stability measurement results of the polycarbazole-based anion exchange material comprising the chain extender prepared according to an embodiment of the present disclosure.

Since water electrolysis is driven in very severe conditions, its chemical stability is very important. For accelerated testing of the chemical durability of the developed material, each of the developed QPC-CL3-TMA and Fumatech (Germany) FAA-3 currently available for anion exchange membrane water electrolysis is added to 1M KOH solution of 80° C., and the ionic conductivity is measured every 100 hours for chemical durability comparison. As shown in FIG. 8, the commercially available FAA-3 has a sharp reduction in performance from the beginning, and in 300 hours, shows a 90% reduction in ionic conductivity compared with its initial ionic conductivity. In contrast, the developed material shows very high chemical durability. Particularly, it can be seen that QPC-CL3-TMA having the maximized molecular weight with the introduction of the chain extending crosslinker shows very high chemical durability compared to the low molecular weight material.

What is claimed is:

1. A method for preparing a polycarbazole-based anion exchange material, comprising:
   preparing a mixture of a halogen-containing carbazole-based monomer and a chain extending carbazole-based comonomer having at least two carbazole groups in a molecule structure;
   carrying out a polymerization reaction of the mixture using a superacid catalyst to produce a polycarbazole-based polymer comprising a halogen-containing chain extender having a chemical structure of the following Formula 1 in which all bonds between monomers in a main chain are C—C bonds; and
   introducing an anion exchange group through quaternization of the polycarbazole-based polymer comprising the halogen-containing chain extender:

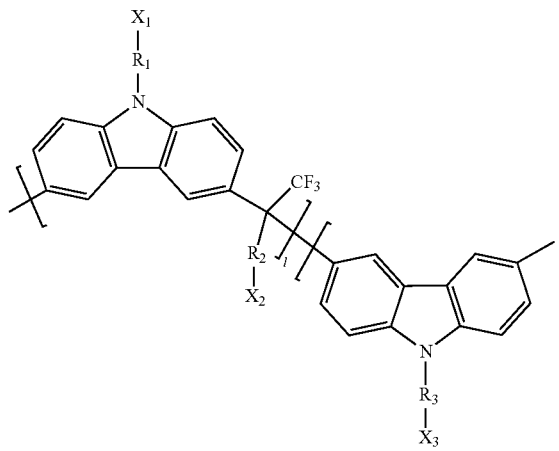

<Formula 1>

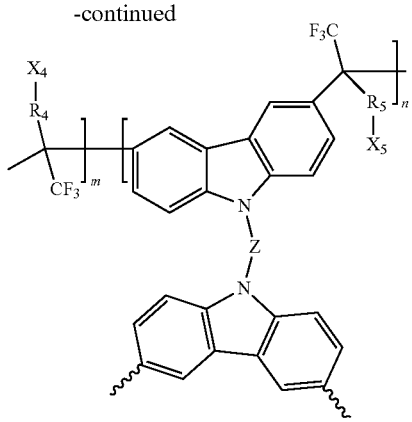

in the Formula 1, each of the $R_1$~the $R_5$ substituents is independently an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen or sulfur atom in its chain; or an alkyl group, an aryl group, an allyl group with at least one anion exchange group; or an alkyl group, an aryl group, an allyl group, a cyano group, a perfluoroalkyl group, and an —O— perfluoroaryl group with a fluorine atom and with at least one anion exchange group, and the substituents are identical or different in each repeating unit or for each repeating unit, each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof, each of the $X_1$~the $X_5$ is independently a hydrogen atom or any one of halogen atoms, chloride (Cl), bromine (Br) and iodine (I), wherein at least one of the $X_1$ or the $X_3$ is a halogen atom, Z is an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen or sulfur atom in its chain; or an alkyl group, an aryl group, an allyl group with at least one anion exchange group; or an alkyl group, an aryl group, an allyl group, a cyano group, a perfluoroalkyl group, and an —O— perfluoroaryl group with a fluorine atom and with at least one anion exchange group, and a number of repeating units, l, m and n, is an integer of 100,000 or smaller, and the l and the m can be 0 and satisfy a condition, $1<(l+m)/n<1,000$.

2. The method for preparing a polycarbazole-based anion exchange material according to claim 1, wherein the superacid catalyst is any one of trifluoromethanesulfonic acid (TFSA, CF3SO3H) and fluorosulfonic acid (HSO3F).

3. The method for preparing a polycarbazole-based anion exchange material according to claim 1, wherein the anion exchange material has a chemical structure of the following Formula 2:

<Formula 2>

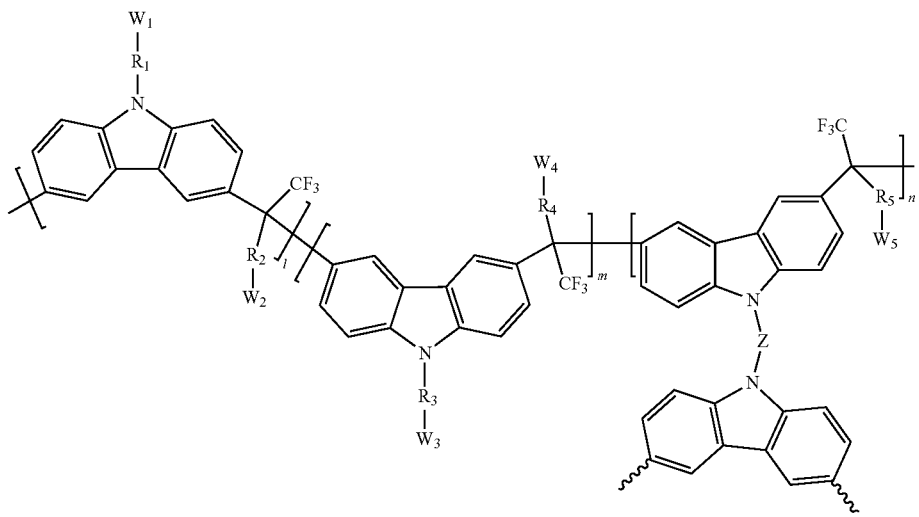

in the Formula 2, each of the $R_1$~the $R_5$ substituents is independently an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen or sulfur atom in its chain; or an alkyl group, an aryl group, an allyl group with at least one anion exchange group; or an alkyl group, an aryl group, an allyl group, a cyano group, a perfluoroalkyl group, and an —O— perfluoroaryl group with a fluorine atom and with at least one anion exchange group, and the substituents are identical or different in each repeating unit or for each repeating unit, each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof,

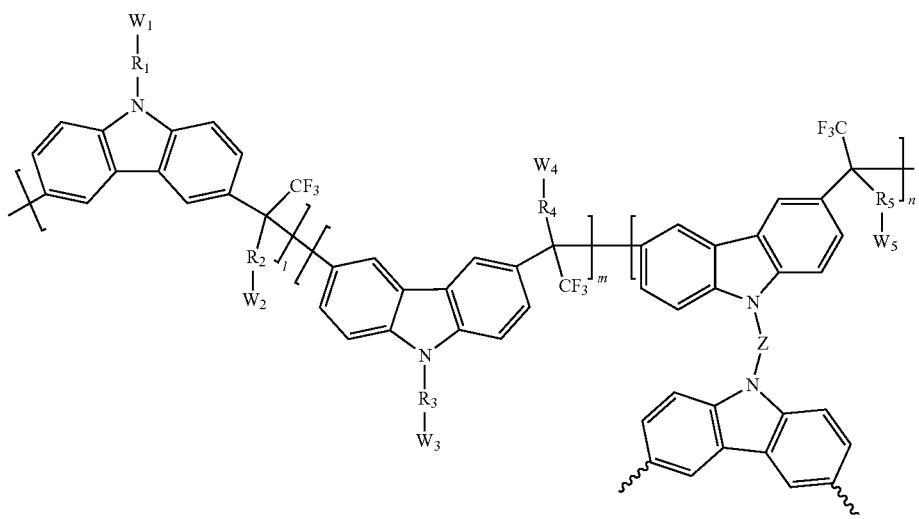

each of the $X_1$~the $X_5$ is independently a hydrogen atom or any one of halogen atoms, chloride (Cl), bromine (Br) and iodine (I), wherein at least one of the $X_1$ or the $X_3$ is a halogen atom, Z is an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen or sulfur atom in its chain; or an alkyl group, an aryl group, an allyl group with at least one anion exchange group; or an alkyl group, an aryl group, an allyl group, a cyano group, a perfluoroalkyl group, and an —O— perfluoroaryl group with a fluorine atom and with at least one anion exchange group, a number of repeating units, l, m and n, is an integer of 100,000 or smaller, wherein the l and the m can be 0, and satisfy a condition of $1<(l+m)/n<1,000$, and each of the $W_1$~the $W_5$ is independently a hydrogen atom or an anion exchange group, wherein at least one of the $W_1$ or the $W_3$ is an anion exchange group, and each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof.

4. The method for preparing a polycarbazole-based anion exchange material according to claim 1, wherein the superacid catalyst is present in an amount of 0.1 to 100 equivalents based on a total number of halogen-containing carbazole-based monomers.

5. The method for preparing a polycarbazole-based anion exchange material according to claim 1, wherein producing the polycarbazole-based polymer comprising the halogen-containing chain extender uses $CCl_4$, $CHCl_3$, $CH_2Cl_2$, $C_2H_2Cl_4$, or an organic solvent containing a halogen atom.

6. A polycarbazole-based anion exchange material comprising a chain extender having a chemical structure of the following Formula 2:

<Formula 2> in the Formula 2, each of the $R_1$~the $R_5$ substituents is independently an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen or sulfur atom in its chain; or an alkyl group, an aryl group, an allyl group with at least one anion exchange group; or an alkyl group, an aryl group, an allyl group, a cyano group, a perfluoroalkyl group, and an —O— perfluoroaryl group with a fluorine atom and with at least one anion exchange group, and the substituents are identical or different in each repeating unit or for each repeating unit, each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof, Z is an alkyl group, an aryl group, an allyl group; or an alkyl group, an aryl group, an allyl group, a cyano group, a perfluoroalkyl group with a fluorine atom; or a perfluoroalkyl group, a perfluoroaryl group, an —O— perfluoroaryl group optionally with at least one oxygen, nitrogen or sulfur atom in its chain; or an alkyl group, an aryl group, an allyl group with at least one anion exchange group; or an alkyl group, an aryl group, an allyl group, a cyano group, a perfluoroalkyl group, and an —O— perfluoroaryl group with a fluorine atom and with at least one anion exchange group, a number of repeating units, l, m and n, is an integer of 100,000 or smaller, wherein the l and the m can be 0, and satisfy a condition of $1<(l+m)/n<1,000$, and each of the $W_1$~the $W_5$ is independently a hydrogen atom or an anion exchange group, wherein at least one of the $W_1$ or the $W_3$ is an anion exchange group, and each anion exchange group is independently at least one anion exchange functional group selected from an amine group, an ammonium group, an amino group, an imine group, a sulfonium group, a phosphonium group, a pyridyl group, a carbazolyl group, an imidazolyl group, a guanidinium group, a ruthenium group, a cobaltocenium group and a piperidinium group or a basic anion exchange functional group thereof.

7. A separation membrane comprising the polycarbazole-based anion exchange material comprising the chain extender according to claim 6.

8. The separation membrane according to claim 7, wherein the separation membrane is any one selected from the group consisting of a single membrane, a reinforced membrane, a composite membrane and a reinforced composite membrane.

9. The separation membrane according to claim 7, wherein the separation membrane is used as a membrane for water electrolysis, redox flow batteries, fuel cells, carbon dioxide reduction, electrochemical ammonia production and decomposition, electrodialysis (ED), reverse electrodialysis (RED) or capacitive deionization (CDI).

10. The separation membrane according to claim 7, wherein the separation membrane is an Anion Exchange Membrane for Water Electrolysis (AEMWE).

11. A water electrolyzer comprising the separation membrane according to claim 7 as an Anion Exchange Membrane for Water Electrolysis (AEMWE).

* * * * *